Dec. 3, 1940.　　　J. T. BEECHLYN　　　2,223,866
MAGNETIC SPEED CHANGER
Filed Aug. 1, 1938　　　2 Sheets-Sheet 1

Inventor
John T. Beechlyn
By attorney

Dec. 3, 1940.  J. T. BEECHLYN  2,223,866

MAGNETIC SPEED CHANGER

Filed Aug. 1, 1938  2 Sheets-Sheet 2

Inventor
John T. Beechlyn

Patented Dec. 3, 1940

2,223,866

UNITED STATES PATENT OFFICE 2,223,866

MAGNETIC SPEED CHANGER

John T. Beechlyn, Worcester, Mass., assignor of one-half to O. S. Walker Co. Inc., Worcester, Mass., a corporation of Massachusetts Application August 1, 1938, Serial No. 222,386

5 Claims. (Cl. 172—284)

This invention relates to magnetic speed changers of a class operating on a harmonic principle, or the principle of a vernier.

In my copending application, Serial No. 56,040, filed December 24, 1935, patented September 27, 1938, No. 2,131,035, I have described a device based on this general principle employing, as shown, a heteropolar arrangement of flux distribution. In this case the torque reactions are similar to those in that application.

The principal objects of the present invention are to provide a device which is especially applicable to a homopolar design, but not strictly limited thereto, in which the magnetic circuits will be completed through structural parts of the machine, including the housing and shafts, thereby to promote a simple and compact construction with a minimum loss of flux; to provide a double construction in which there are two paths for the flux with means whereby there is practically no loss of straying flux; to provide a speed changer with a power drive, such as an electric motor, in a self-contained unit, so constructed that, without involving any considerable axial extension, stationary mountings for all the bearings can be provided; to provide means particularly suited for high speed application, whereby a solid, or non-laminated, rotor may be employed without incurring undue losses; to provide, preferably, the inside rotor of such construction as to cut down the loss through eddy currents at high speeds on account of diminishing the magnetic variations through this member, and to decrease the complication and expense as compared with other magnetic speed changers, thus decreasing the size and weight for any given capacity.

Other objects and advantages of the invention will appear hereinafter.

Reference is to be had to the accompanying drawings, in which

This magnetic drive is shown as a component part of a power unit that includes an electric motor, preferably of the induction type, which, on account of its constant speed characteristics, is suitable for many applications wherein a high speed drive is required, but it is not limited to any connection with a motor. Such a unit may be applied directly in connection with many applications such as internal grinding machines, by attaching to the end of the high speed shaft a tool holder, impeller, or similar implement, in a wood working machine, or air compressor.

Figure 1:
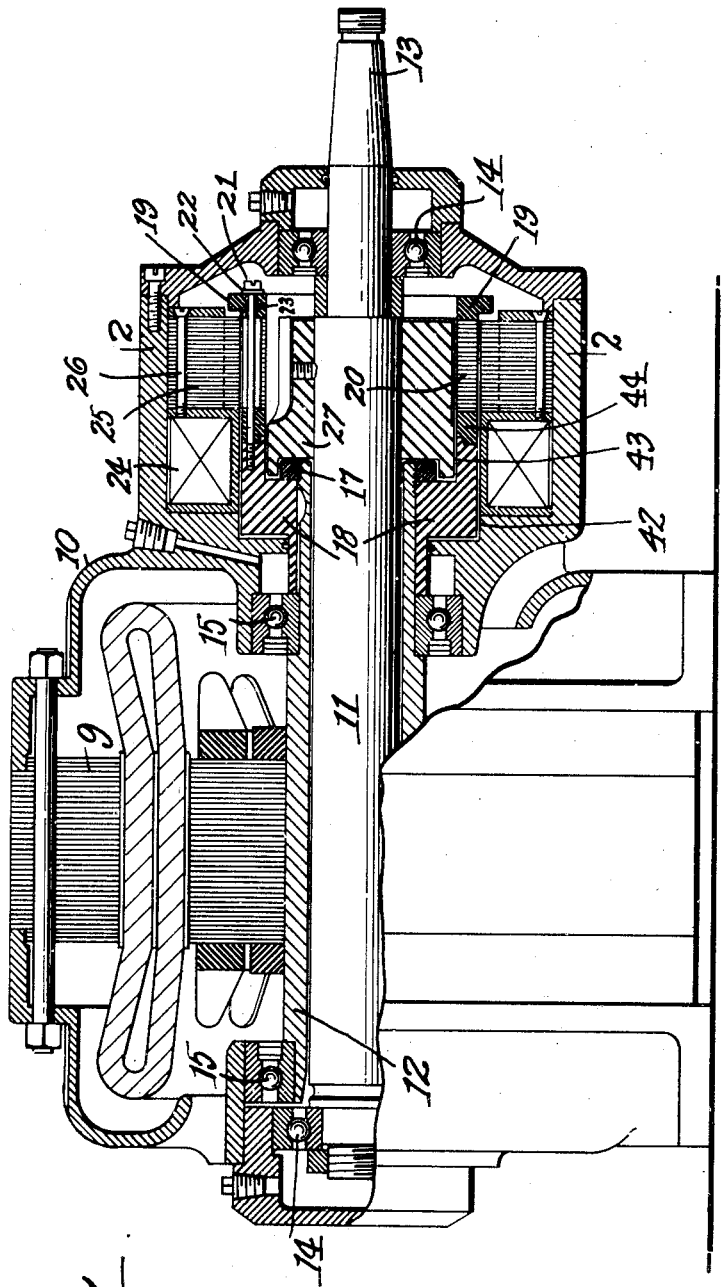
Fig. 1 is a longitudinal central sectional view of a single flux speed changer and motor combined.
Figure 2:
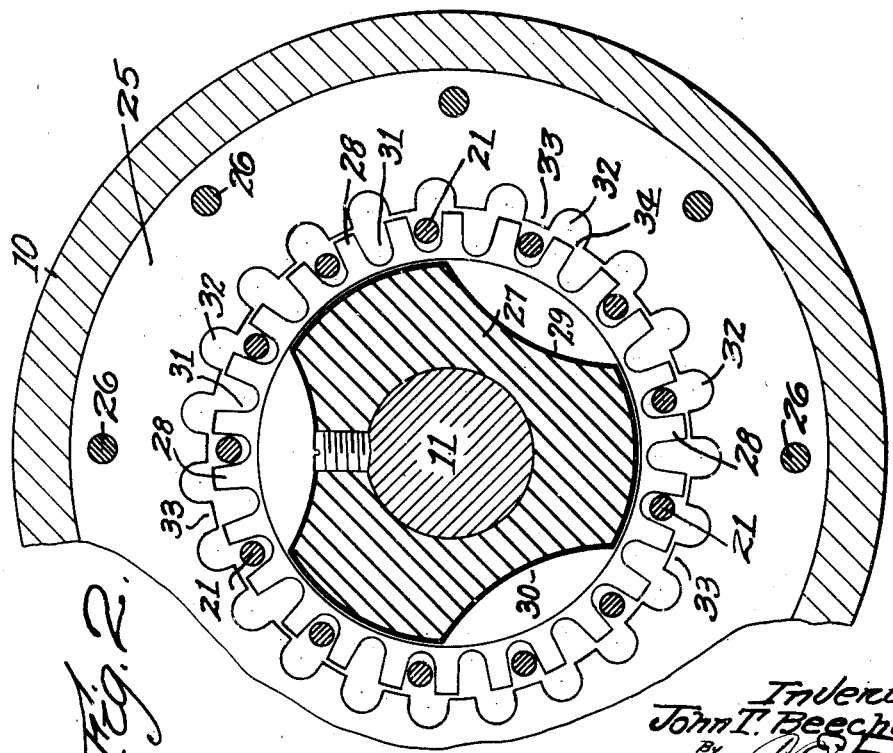
Fig. 2 is a sectional view thereof on the line 2—2 of Fig. 1.

The drawings show, Figs. 1 and 2 especially, the invention embodied in a homopolar speed changer in which the motor 9 and speed changer are located compactly in a stationary casing 10 of magnetic material. The motor itself is so constructed as to rotate, in a known manner, a hollow central shaft 12 mounted in bearings 15 near the opposite ends of the motor and carried by the casing. Through the speed changer, as will appear, is operated a central shaft 11, within the hollow shaft, but mechanically free therefrom. This shaft 11 is capable of carrying whatever kind of tool is to be employed by means of a tapered head 13. The shaft 11 is provided with ball bearings 14 at the two ends of the shaft and at the two ends of the casing. Ball bearings 15 for the outer shaft are located outside the shaft 12. The two shafts 11 and 12, which are concentric, never come into contact with each other, of course, as there is clearance provided between them.

The end of the shaft 12 is provided with a nut 17 of magnetic material screwing up against a surface on a rotor 18, also of magnetic material, which is keyed to the shaft 12. In this way, of course, this rotor 18 can be held in proper longitudinal position with relation to the shaft. It is provided with a non-magnetic annulus 19 formed of stainless steel or bronze and holding a toothed laminated section 20 of iron which is secured in place by screws 21, also of non-magnetic material, preferably stainless steel. These screws extend through it from one side to the other and there is a thin bronze washer 22 between the head of each screw and the side of the annulus. These screws are electrically insulated from the annulus 19 by mica 23 surrounding them. An annulus 44 of non-magnetic material is interposed between the laminated section 20 and the solid magnetic section of the member 18, thereby opposing any direct magnetic course between these two sections.

The extension of the motor casing 10 forms a solid support for an annular coil 24 wound in a spool, one flange of which serves as a clamping plate for a laminated stator 25 which is held by screws 26.

The inner rotor 27, which is fixed to the shaft 11 by set screws, or the like, embodies at one end a cylindrical section adapted to cooperate magnetically, through the torqueless clearance gap 43, with an internal surface on the member 18. Over the remaining section of the rotor the circular outline is cut away to form a number of salient poles adapted to register with the laminated section 20 in the outer rotor. The construction of the inner rotor 27 may vary in accordance with the nature of the core losses in this member as determined by the speed for which it is designed. At moderate speeds the hysteresis loss is of greatest importance, whereas at high speeds the eddy current loss, tending to increase as the square of the frequency, becomes the predominating component of the total loss. Both losses owe their origin to the difference between magnetic densities transmitted at any one instant to the pole face by individual teeth 28 in the outer rotor, which causes a series of magnetic ripples to pass over the pole face during rotation. In certain high speed applications, the frequency of these ripples with respect to the pole may reach many kilocycles per second. However, the currents generated by the ripples in the pole face react on their own causation and tend to diminish the flux variations as the speed is increased, thereby limiting the rise of both hysteresis and eddy current loss, but especially the latter.

Pursuant to this theory, for high speed applications, a non-laminated rotor 27 or salient pole made from a pure grade of iron having relatively high electrical conductivity is employed so that, while the induced current may be high, the product of resistance and the square of the current, which determines the eddy loss, will be moderate. To further enhance this effect the pole face is coated with a metal 29 of superior electrical conductivity. This coating, which may be of copper, is conveniently applied as an electrolytic deposit, and, to promote adherence, may extend over the entire surface of that section of the rotor registering with the power gap.

As a result of this construction the rotor 27, at high speeds, will be the seat of relatively large currents involving but a slight ohmic loss. The reaction of the currents on the field tends to produce a nearly uniform magnetic gradient across the pole face and, since the variations are largely smothered in the copper, there will be but little magnetic disturbance in the ferric material of the rotor to produce any hysteresis loss.

The rotary member 18, as stated, is provided with laminations 20 and they are in the form of wide teeth 28 separated by spaces 31 through which screws 21 pass to hold the annular sheets together and form a rigid structure. The outside member or stator 25 is also formed of annular sheets held together by screws 26 and is provided with projecting teeth 33 separated by spaces 32.

It will be noticed that the number of teeth 33 is less than the number of teeth 28 on the member 20 and that they project toward each other radially, but are separated by a gap 34. The differential in rotation between the two rotors 20 and 27 varies in regular order. The two series of radial projections are arranged concentrically and the spacing of each one is uniform, but the moderate difference in the spacing of the two series is provided in an arrangement akin to a vernier. This difference causes the occurrence of nodes and intermediate spaces where a number of poles are not in alignment. Angular motion applied to one series would cause a relatively progressive rapid rotation of the nodes. The high speed or member 20 is magnetically responsive to the magnetic transfer of the path of least reluctance.

In a homopolar design of speed changer, the flux must necessarily flow axially. The cross-sectional magnetic area available for this axial conveyance of flux will determine the axial dimension of the laminated torque sections of the device best adapted to produce maximum torque.

Of course, it will be seen that the lines of magnetic circuit in linkage with the magnetic coil 24 successively traverses the stator casing 10, the laminated stator section 25, the outer rotor lamination 20, the poles of the inner rotor 27, and axially traverse the inner rotor, leaving this member at the annular clearance gap 43. Then they traverse a non-laminated section of the outer rotor and are returned to the stator housing over or through the torqueless clearance gap 42. A portion of this flux will also be transmitted from the inner rotor through the shaft and will eventually come back to the casing over the available flux paths throughout the machine. Such dispersal of the lines of force does not result in any material loss of power because they are all brought back again into the flux circuit through corresponding parts of the machine formed of magnetic material. Therefore, one material object of this invention is practically to use all the magnetism.

It will be observed that there are only narrow clearance torqueless gaps in this magnetic circuit.

Figure 3:
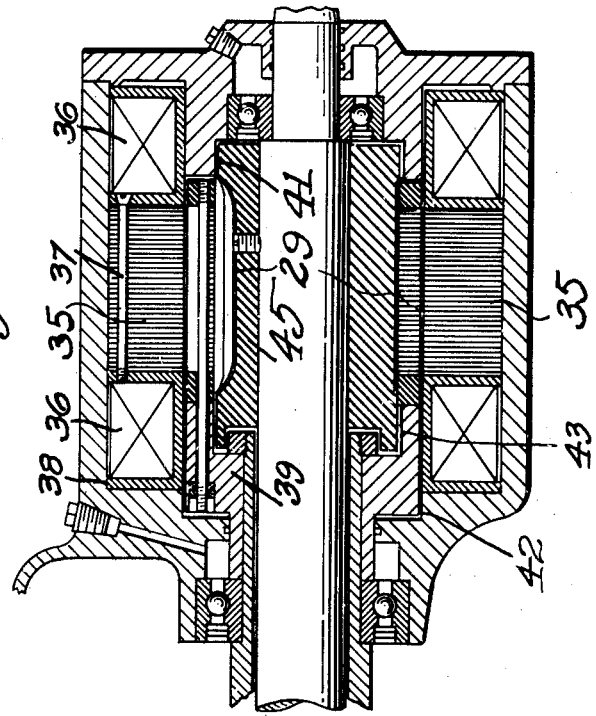
Fig. 3 is a central longitudinal sectional view of a modified form of speed changer in which there are two paths for the flux and little or no chance for the loss of magnetism.

In the form of the invention shown in Fig. 3 a double course of magnetic flux is shown, the rest of the device being capable of the action shown in Fig. 1. In this case there are two coils 36 arranged in annular casings secured together by screws 37 which, in both cases, pass through the metal of the casing 38 on the one side and into the metal of that casing on the other and through the laminated stator 35. In this case the member 39 and its parts are not exactly of the same design as above described but are changed only in dimension and not in any material manner. Here, there are three torqueless gaps 41, 42 and 43 and the central rotor 45 is constructed the same as in the other case, with its copper coating 29, except that it is of double design. Here the path of all of the flux is entirely confined to this particular part of the device and there is very little chance of any magnetism escaping from the magnetic circuit provided for it. The gaps 41 and 43 are as small as is convenient with a machine rotating at a high speed, like this one, and there is no place for any kind of force to disappear at these points anyway. Consequently, two flux circuits are produced, each one of them practically complete and avoiding practically all loss. It is not necessary to describe other elements of this form of the invention because otherwise it is the same as that shown in Figs. 1 and 2.

It will be seen, therefore, that this speed changer provides an arrangement in which the magnetic flux will pass through the structural parts of the machine including the housing, shaft, etc., or through the path provided for it, and that there will in both cases be a minimum loss of flux. It will also be seen that in the double construction there is practically no loss of magnetism.

It will also be seen that the speed changing and power drive constitute a self-contained unit adapted for high speed. However, while the arrangement that has been illustrated is particularly suited to provide increased speed from a power drive, it will be apparent that the features which constitute new invention, as defined in the claims, are equally applicable to a speed reducing device.

It will also be seen that the inside rotor is so arranged that at high speeds the loss by eddy currents will be very much diminished if not entirely avoided and also the loss by hysteresis will be largely eliminated. The machine provides for increased energy per unit of weight as compared with other magnetic speed changers, decreasing the size and weight for any given capacity.

Having thus described my invention and the advantages thereof, I do not wish to be limited to the details herein disclosed, otherwise than as set forth in the claims, but what I claim is:

1. In a magneto-dynamic machine, the combination of two magnetic members relatively rotatable with an annular clearance gap between them, a series of circumferentially disposed radial flux channels in one of said members, said channels terminating at and bounding the gap, a salient pole facing the gap on the other of the two members, a metallic coating having high electrical conductivity on the face of the pole, said face bounding said clearance gap, means for causing a magnetic flux of constant polarity to successively traverse the pole, the coating, the gap, and a group of the said channels opposite the pole, said coating being adapted, through inductance, to coact with said two members to reduce magnetic variations in the pole face normally caused by relative motion of said channels and pole during rotation.

2. In a magneto-dynamic machine, the combination of two concentric magnetic members relatively rotatable with an annular clearance gap between them, a series of circumferentially disposed radial flux channels in one of said members, said channels terminating at and bounding the gap, a concentric salient pole facing the gap on the other of the two members, a metallic coating having high electrical conductivity continuously secured to the face of said pole and extending over the entire surface of said face, said face bounding said clearance gap, means for causing a magnetic flux of constant polarity to traverse the pole, the coating, the gap, and a group of the said channels opposite the pole, said coating being adapted, through inductance, to coact with the two magnetic members to reduce magnetic variations in the pole face normally caused by relative motion of said channels and pole during rotation.

3. A magnetic power transmission device, comprising three concentric magnetic members, the intermediate member having a non-magnetic part and two annular magnetic parts relatively fixed with respect to the non-magnetic part, relatively located with respect to the three members in such a position that the magnetic parts constitute a part of a homopolar magnetic circuit traversing also the other two members, concentric power gaps between one of the magnetic parts and the innermost and the outermost of said three members, and torqueless clearance gaps between the other of said magnetic parts and the innermost and the outermost of said three members.

4. A magnetic power transmission device comprising three concentric magnetic members, two spaced co-axial annuli located on the outermost member, two cored flux circuits, each circuit being in linkage with one of said annuli and traversing said three members; the intermediate member having a non-magnetic part and two magnetic parts relatively located with respect to the three members so as to provide a part of one of said circuits; power gaps between one of the magnetic parts and the other two members, torqueless clearance gaps between the other of said magnetic parts and said other two members; and a torqueless gap between the innermost and outermost members, forming a part of the other circuit.

5. A magnetic power transmission device comprising three concentric magnetic members, spaced, co-axial solenoids suited to be energized by an electric current, a cored flux circuit in linkage with each of said solenoids, said circuits merging in a zone between said solenoids; the intermediate member having a non-magnetic and two magnetic parts so located as to form a part of one of said circuits, there being power gaps between one of the magnetic parts and the innermost and outermost of said members, and torqueless clearance gaps between the other magnetic part and the innermost and outermost of said three members, and a torqueless gap directly between the innermost and outermost members, forming a part of the other flux circuit, said circuits merging in the zone of said power gaps.

JOHN T. BEECHLYN.